US011161060B2

(12) United States Patent
Saint-Vincent et al.

(10) Patent No.: US 11,161,060 B2
(45) Date of Patent: Nov. 2, 2021

(54) PROCESS AND APPARATUS FOR IN-LINE DENSIFICATION OF A HETEROGENEOUS FLUID USING ACOUSTIC ENERGY

(71) Applicants: Stephen Saint-Vincent, New Braunfels, TX (US); Yancy James Tiller, New Braunfels, TX (US)

(72) Inventors: Stephen Saint-Vincent, New Braunfels, TX (US); Yancy James Tiller, New Braunfels, TX (US)

(73) Assignee: AGAR CORPORATION, INC., Houston, TX (US)

( * ) Notice: Subject to any disclaimer, the term of this patent is extended or adjusted under 35 U.S.C. 154(b) by 265 days.

(21) Appl. No.: 15/967,288

(22) Filed: Apr. 30, 2018

(65) Prior Publication Data

US 2018/0311597 A1 Nov. 1, 2018

Related U.S. Application Data

(60) Provisional application No. 62/491,711, filed on Apr. 28, 2017.

(51) Int. Cl.
| | | |
|---|---|---|
| *B01D 19/00* | (2006.01) | |
| *B01D 17/04* | (2006.01) | |
| *B01D 45/08* | (2006.01) | |
| *B01D 50/00* | (2006.01) | |

(52) U.S. Cl.
CPC ....... *B01D 19/0073* (2013.01); *B01D 17/044* (2013.01); *B01D 19/0063* (2013.01); *B01D 19/0078* (2013.01); *B01D 45/08* (2013.01); *B01D 19/0042* (2013.01); *B01D 50/002* (2013.01)

(58) Field of Classification Search
CPC ............ B01D 19/0073; B01D 19/0078; B01D 17/044; B01D 19/0063; B01D 45/08; B01D 19/0042; B01D 50/002
See application file for complete search history.

(56) References Cited

U.S. PATENT DOCUMENTS

| | | | | |
|---|---|---|---|---|
| 3,715,863 A * | 2/1973 | Zanoni | ............... | B01D 19/0052 96/170 |
| 5,036,697 A * | 8/1991 | Fujiwara | ............ | B01D 19/0042 62/126 |
| 6,652,630 B1 * | 11/2003 | Starlinger-Huemer | ...................... | B29C 48/76 96/194 |
| 2008/0017219 A1 * | 1/2008 | Franklin | ................... | B08B 3/12 134/1 |

(Continued)

FOREIGN PATENT DOCUMENTS

JP 03214916 A * 9/1991

*Primary Examiner* — Dung H Bui
(74) *Attorney, Agent, or Firm* — David M. Breiner; BrownWinick Law Firm (57) ABSTRACT

An inline process for imparting sonic energy plus a liquid gas separator to a continuous flow of a heterogeneous liquid to de-gassify the liquid and thereby provide for separation and extraction of selected liquid and gas components. The device utilizes a flat plate oriented in the direction of flow within the liquid so as to impart pressure fronts into the liquid to initiate liquid gas separation followed by a line pressure regulation, fluid jet stream, device to impart fluidic shear to fluid jet stream, and a separation vessel to facilitate mass transfer.

9 Claims, 4 Drawing Sheets

(56) References Cited

U.S. PATENT DOCUMENTS

| | | | | |
|---|---|---|---|---|
| 2009/0145737 A1* | 6/2009 | Kamen | ................ | B01D 1/221 |
| | | | | 202/185.1 |
| 2011/0240524 A1* | 10/2011 | Fenton | ................ | B01D 17/042 |
| | | | | 208/188 |
| 2012/0073950 A1* | 3/2012 | Kamen | ................ | B01D 1/28 |
| | | | | 202/187 |
| 2012/0227761 A1* | 9/2012 | Leighton | ................ | B08B 3/10 |
| | | | | 134/1 |
| 2015/0343329 A1* | 12/2015 | Jensen | ................ | B01D 19/0047 |
| | | | | 95/260 |
| 2016/0199756 A1* | 7/2016 | Saint-Vincent | .... | B01D 19/0078 |
| | | | | 95/30 |
| 2016/0258266 A1* | 9/2016 | Frick | ................ | B01D 3/007 |
| 2018/0009007 A1* | 1/2018 | Craft | ................ | B08B 7/026 |
| 2018/0223200 A1* | 8/2018 | Zhou | ................ | C10J 3/845 |

* cited by examiner

PROCESS AND APPARATUS FOR IN-LINE DENSIFICATION OF A HETEROGENEOUS FLUID USING ACOUSTIC ENERGY

CROSS REFERENCE TO RELATED APPLICATIONS

This application claims the benefit of U.S. Patent and Trademark Office Provisional Application No. 62/491,711 which was filed on Apr. 28, 2017, the entirety of which is incorporated herein fully by reference.

BACKGROUND OF INVENTION

There are numerous heterogeneous liquids that are comprised of constituents that have differing vapor pressure and specific gravity, wherein liquid and gas phases can be formed and preferentially separated. The high vapor pressure, low specific gravity components are disbursed, and or solubilized throughout a bulk, low vapor pressure carrier liquid. Some of these heterogeneous liquid streams may contain commercially saleable liquid and gasses if the plurality of stream components can be separated and extracted at a reasonable rate and cost. Examples of separations of such heterogeneous liquids include the extraction of light end hydrocarbons (C1-C5; methane, ethane, propane, butane, and pentane and related species) from Crude Petroleum as produced at the wellhead, or other liquids.

The recent proliferation of Oil & Gas Production from Shale type formations yield liquid product that has high Reid Vapor Pressure. These crude petroleum liquid products are not safe to transport. Therefore, expensive stabilization processes are required to extract the light end hydrocarbons to render the crude petroleum safe for transportation.

Current state of the art crude petroleum stabilization process facilities require the use of large, complex gas compression and expansion equipment along with large thermal transfer apparatus for chilling various vapor streams for subsequent condensation and recovery. These facilities are very capital intensive. Additionally, stabilization facilities require large scale processing to make the per unit volume processed economically viable. These crude oil stabilization facilities must, therefore, be constructed at collection gathering facilities and/or pipeline terminals.

High residual Reid Vapor Pressure of the crude oil produced by tight oil/shale type formations are characterized by having a substantial quantity of retained natural gas constituents of C1-C5 (methane, ethane, propane, butane, and pentane and other derivative species). The surface handling of these liquids between the wellhead and the stock tank typically utilize various means of lowering the fluid pressure to atmospheric. At each stage of pressure reduction, a quantity of gas is released. The final pressure drop stage to atmospheric pressure can yield in excess of 20 standard cubic feet per gallon of rich gas. This volume of rich gas vapor is typically released to the atmosphere contributing ozone-forming, ground level pollution.

U.S. Pat. No. 5,538,628, Logan; James R. (Moline, Ill.) describes a device for imparting sonic energy to a continuous flow of an emulsified liquid to de-emulsify the liquid and thereby provide for separation and extraction of selected liquid components. The device utilizes a flat plate oriented in the direction of flow within the liquid so as to impart pressure fronts into the liquid to produce the separation.

U.S. Pat. No. 5,885,424, Davis; R. Michael (Fort Worth, Tex.), Hadley; Harold W. (Olds Alberta, Calif.), Paul; James M. (DeSoto, Tex.) describes a method for breaking an emulsion comprising oil and water into oil and water phases comprising treating the emulsion with a chemical demulsifier and passing the mixture through a hollow chamber having a uniform cross-section and subjecting the mixture to acoustic energy in the frequency range of about 0.5 to 10.0 kHz, preferably 1.25 kHz, to enhance breaking the emulsion into a water phase and oil phase. The oil phase is then separated from the water phase by gravity separation and recovered. The sonic energy is generated by a transducer attached to the mid-section of the upper or lower outer surface of the hollow chamber. For emulsions containing light oil having an API gravity greater than 20 and water, the emulsion can be broken by the use of acoustic energy in the frequency range of about 0.5 to 10.0 kHz without the addition of chemical demulsifiers.

U.S. Pat. No. 6,090,295, Raghavarao, et al., describes a method and apparatus for demixing an aqueous solution. The aqueous solution has at least two aqueous phases. The method comprises applying acoustic energy to the aqueous solution. The apparatus comprises a mechanism for applying acoustic energy to the aqueous solution until the aqueous solution is demixed to clarity.

In U.S. Pat. No. 5,372,634 Raghavarao; Karumanchi S. M. S. (Boulder, Colo.), Todd; Paul W. (Boulder, Colo.) there is presented a sonic apparatus for degassing liquids. The apparatus includes a vessel for receiving and releasably retaining an open-top container and adapted to be closed with the container therein, transducer suspension structure positioned in the vessel, an ultrasonic transducer suspended from the structure and disposed in the container spaced from the walls and bottom of the container and beneath the surface of a liquid contained therein. The apparatus further includes a signal generator outside of the vessel for transmitting power to the transducer, and a vacuum pump for maintaining the vessel interior at a vacuum.

U.S. Pat. No. 4,428,757—Hall; Mark N. (College Place, Wash.) describes a gas stabilization unit that eliminates unwanted gaseous material and adds desired gaseous material from a fluid stream by applying sonic vibrations in two stages to create readily removable bubbles of the gaseous material. A siphon assembly located downstream removes the bubbles.

U.S. Pat. No. 4,371,385, Johnson; Steven H. (Lakewood, Colo.) describes a process where a liquid deaeration apparatus having a deaeration chamber, a positive displacement pump downstream of the deaeration chamber, a first flow restrictor upstream of the deaeration chamber, a low pressure sink connected to an air outlet of the deaeration chamber, and a second flow restrictor between the pump and the liquid outlet of the deaeration chamber to raise the pressure at the liquid outlet above that at the air outlet to cause volatilized gas to be removed via the air outlet of the deaeration chamber.

U.S. Pat. No. 4,070,167 Barbee; Eugene Hartzell (East Rochester, N.Y.), Brown; Robert Cushman (Rochester, N.Y.) describes a process where bubbles are eliminated from a liquid such as a photographic emulsion by passing the emulsion through a horizontal tubular container while pulling a vacuum on the container and subjecting the emulsion to ultrasonic vibrations from an ultrasonic transducer having a horn located in a well in the bottom of the container. Emulsion is pumped out of the container and delivered through a conduit to the point of use. The delivery circuit can include a secondary gas separation chamber which also has a transducer horn therein. Provision is made for selectively recycling part or all of the emulsion back into the well. The container can be operated either partly full or completely full of liquid. Provision is also made for cleaning the internal walls of the apparatus by injecting a swirling stream of liquid into the tubular container to flow through the container and downstream portions of the system.

U.S. Pat. No. 8,133,300 B1, Grant; describes in some embodiments, a chamber may be configured to separate oil and gas. For example, the oil and gas may be separated as they exit a compressor, an oil storage tank, etc. In some embodiments, the gas may be a heavy gas and the oil may be compressor oil. One or more heated baffles may interact with the oil and gas to increase the velocity of the gas flow to inhibit the gas from absorbing into the oil. In some embodiments, when the compressor feeding the chamber is operating at a decreased compression rate, the chamber may continue to heat the oil to vaporize impurities out of the oil. The impurities may then be vented out of the chamber through the bleed valve to a gas inlet scrubber.

SUMMARY OF INVENTION DESCRIPTION

The main objective of this invention is to describe an inline process to increase the specific gravity and reduce the total vapor pressure of a heterogeneous liquid comprising a plurality of constituents, (some of which have greater vapor pressure and lower specific gravity than other components) and reduce its total vapor pressure.

The practical use of this invention is applicable to a wide range of industrial processes such as food and beverage manufacturing, chemical process industry, and municipal water treatment, but is not limited to these industrial uses.

The specific description of this invention is the application of this disclosure to the processing of light hydrocarbon liquids such as pipeline Condensate, Natural Gas Liquids, high American Petroleum Institute (API) Gravity crude oil and other like hydrocarbon streams. This present invention is for the treatment of heterogeneous hydrocarbon fluids for the economical separation of light end hydrocarbons, C1-C5 from liquid crude petroleum streams.

Many current oil and gas production processes between the final separator and the liquid storage vessels have minimal control of flash off gases. These uncontrolled flash off gases are of concern for economic productivity, safety and environmental reasons. This flash off gas also can be the most valuable natural gases, in that the energy content can be as high as 2,500 BTU/scft. The estimated quantity of flash off gases is on the order of 26.6 Bcf/year in the continental United States. Studies have shown that uncontrolled gas vapor loss is costing Producers between 5-15% of TOTAL revenue.

In accordance with the present invention, there is provided a method for degassing fluid streams wherein the immediate description of the present invention is an inline process wherein the process comprises or consists of a sonic processor, means of providing back pressure on liquid under process, a means of providing a shear force to the liquid stream, and a means for separation of gas and liquid.

Acoustic Emulsion Breaking (AEB) is a phenomenon that is observed in which a fluid with dissolved gases, and or high vapor pressure components are subjected to acoustic pressure. Acoustic pressure is a time varying compression and rarefaction phase applied to a fluid's mean pressure. Gas transport from the bulk liquid phase to a bubble phase is a unidirectional process driven by two physical mechanisms: Henry Law and bubble growth dynamics.

Acoustic pressure waves consist of a pressure oscillation about a mean pressure. The pressure oscillation consists of a compression and rarefaction phase. During the rarefaction phase, the pressure in the liquid is reduced permitting high vapor pressure constituents to form bubbles. During this rarefaction phase, each bubble's surface/volume ratio is greater as the bubble expands than as it contracts (the surface of the expanded bubble is much higher than that of the compressed bubble).

The expanding bubble internal pressure is below the fluid pressure; thus gas is diffused into the bubble. As a result, the bubble draws more gas into its interior during its expansion than it releases during contraction and, therefore, quickly increases in size. This process is called "directed" or "rectified" diffusion. The bubbles are uniformly distributed in the liquid and have a high total surface area, the migration of the dissolved gasses into them is fast and homogeneous throughout the affected liquid volume. The result is the formation of a large number per unit volume of liquid of oscillating bubbles containing the gasses that were previously dissolved in the liquid medium.

Once the initial formation of bubbles is initiated, the second phase of the process is to ensure that the bubbles continue to grow in size, beyond a critical radius, and then separated via conventional two or multi-phase separators. The dynamics of forcing the bubble radius to increase is by controlling the pressure profile of the liquid stream under process to exploit bubble physics:

$$p_b - p = \frac{2S}{R}$$

Where:
$p_b$—internal bubble pressure
p—pressure external to bubble
S—the surface tension of the fluid
R—the bubble radius When the bubble formation is initiated under the applied acoustic pressure, the internal bubble pressure is at the saturated vapor pressure of the liquid.

$$p_B = p_V(T)$$

Where:
$p_B$—internal bubble pressure
$p_V(T)$—saturated vapor pressure at temperature T Bubble growth is controlled by the relationship of the liquid surface tension and the pressure in the system.

$$p = p_V - 2S/R$$

Where:
p—localized pressure in the system
$p_V$—saturated vapor pressure
S—surface tension of the fluid
R—radius of the bubble.

Thus, if the localized pressure is held slightly under the saturated vapor pressure, the radius of the bubble will increase, until a critical dimension is realized.

Disengaging the gas phase from the liquid is accomplished using well-known physics relating to Stokes' Law where the force between the gas bubble and liquid is:

$$F_g = (\rho_p - \rho_f) g 4/3 \pi R^3$$

The terminal velocity between the fluid and gas bubble is:

$$v_s = \frac{2}{9} \frac{(\rho_p - \rho_f)}{\mu} g R^2$$

Where:

$\rho_p$—density of the gas phase (kg/m$^3$)

$\rho_f$—density of the liquid phase (kg/m$^3$)

g—Gravity (m/s$^2$)

R—radius of the bubble (m)

μ—dynamic viscosity (kg/m*s)

Since $\rho_p \ll \rho_f$, the $F_g$ is opposite the force of gravity. As the bubble diameter increases as a result of bubble coalescence, the bubble velocity will increase relative to the liquid as well.

Typical crude petroleum liquids produced from shale type formations have high Reid Vapor Pressure (RVP) and American Petroleum Institute (API) Gravity. High RVP values in the crude petroleum product relate to high vapor pressure of light end hydrocarbons. High API Gravity crude petroleum liquids, such as Natural Gasoline Liquids (NGL) or Condensate relate to low specific gravity relating to the majority of the hydrocarbon species between C1 and C40.

High RVP in the petroleum condensate products produced from shale formation is the resultant of a high concentration of light end hydrocarbons $C_1$-C6 in the liquid 130 product. The boiling point of the <$C_4$ components are below 0° C., with vapor pressures well above atmospheric, greater than 861.9 kPa at 10° C. (25 psi at 50° F.). The light end hydrocarbons in the liquid phase are sometimes referred to as stranded gas.

Conventional Oil & Gas Production involves the process of reducing the pressure in the produced fluids from reservoir pressure to a pressure suited for Gas distribution and Liquid storage. At each stage of pressure reduction, a quantity of gas is released from the liquid. However, at the final stage of pressure reduction to atmospheric pressure, there is still substantial quantity of gas that will be released overtime as the liquid petroleum product weathers in stock tank storage, transportation, etc.

It is the main objective of this invention to demonstrate a means of introducing acoustic energy into the liquid product stream containing residual or stranded gas whereby (1) the acoustic energy causes the stranded gas to come out of solution and then (2) a means of causing the liquid and gas phases to undergo a series of process stages whereby the liquid and gas phases disengage from each other and are subsequently processed as two independent products.

A further objective of the present invention is to disclose a means of introducing a localized reduction in pressure in order to increase bubble radius, minimizing potential of gas reabsorption into the liquid.

Imparting acoustic energy to the fluid under process is by means of an-acoustic source coupled to an acoustic radiation surface or a plurality of acoustic sources coupled to a plurality of radiation surfaces. The means of acoustic source may be by solid-state transduction such as Piezo-electric and Magnetostrictive, or Electro-Dynamic.

A further objective of the present invention is to disclose a means of introducing shear stress within the fluid such that the gas phase is disengaged from the liquid.

A further objective of the present invention is to disclose a means of separating multi-phase fluid in a separator.

Gas discharge from both an accumulator and a process tower is optimally to a vapor recovery unit that will process the gas phase for subsequent distribution.

DESCRIPTION OF THE PREFERRED
EMBODIMENT OF THE INVENTION

Figure 1:
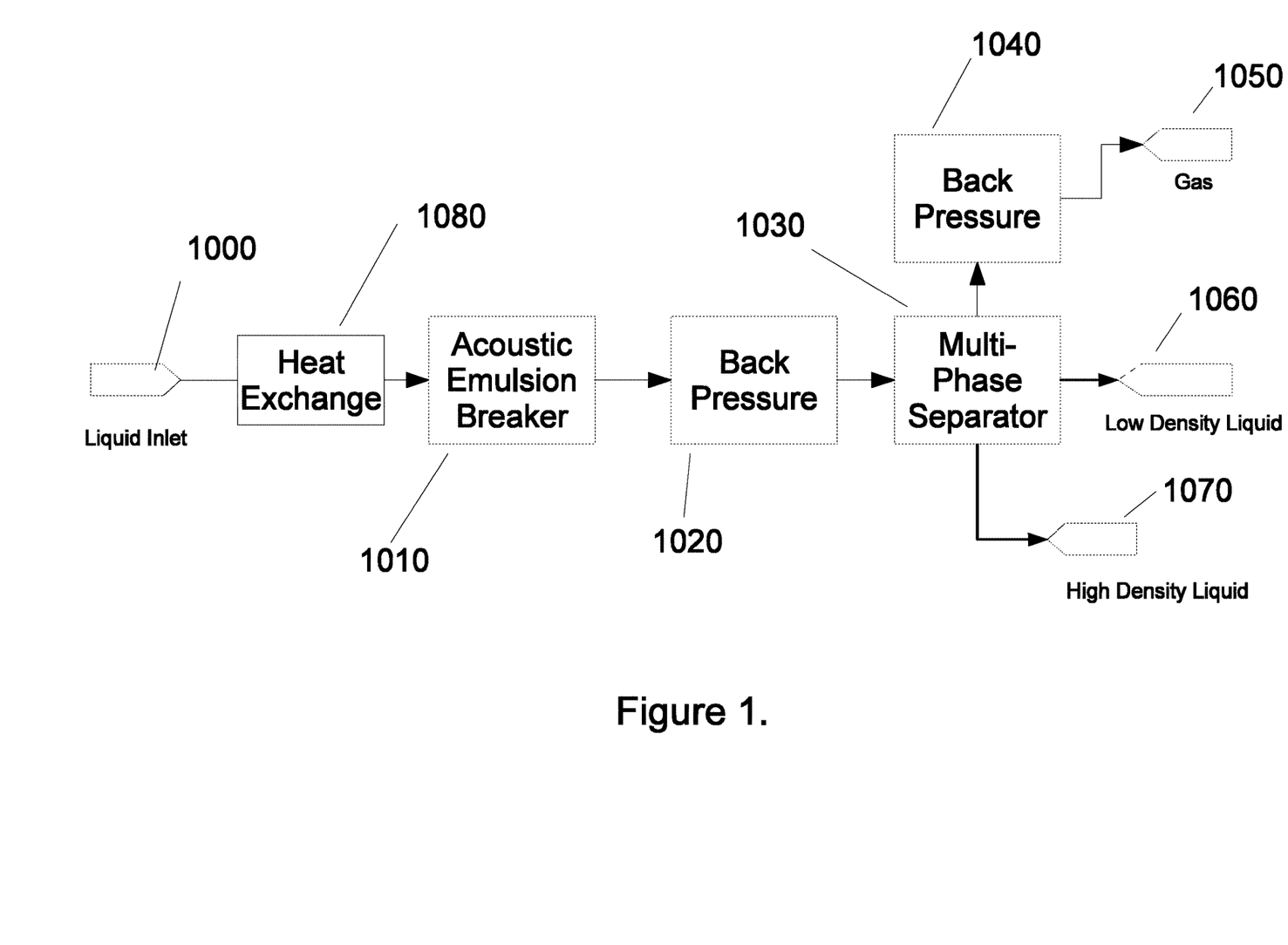
FIG. 1 is an illustration of the process flow diagram.

The present invention comprises a preferred embodiment for the degassing of high API Gravity and high Reid Vapor Pressure hydrocarbon fluids. The process begins with the input of a heterogeneous fluid which a multi-phase fluid is containing constituent phases including gaseous phases dissolved in the liquid phase. The Liquid (1000) enters the process and is fluidly connected to the Acoustic Emulsion Breaker (AEB) (1010). The liquid under process enters an acoustic reaction chamber wherein the fluid under process is exposed to an acoustic signal of a nominal frequency of 1,000 Hz. The operating frequency is largely related to the preferred resonant mode of operation of the acoustic source. The degassing phenomenon is known to occur over a wide range of frequencies from 100 Hz→1M Hz depending upon the acoustic source geometry and architecture. The acoustic signal is preferably a square wave, where those skilled in the art will know that a square wave signal has higher order harmonics that enhance the degassing phenomenon.

The AEB (1010) is fluidly connected to a Back Pressure Device [1020] (which may be positioned upstream or downstream of the AEB) that provides a means of supplying back pressure within the process upstream of the Back Pressure Device [1020]. A Back Pressure Device (2040) can be comprised of a single element or a plurality such as back pressure regulators [2020] and nozzles [2030] (see FIGS. 2A and 2B). Those skilled in the art will know that backpressure can be supplied by frictional drag in a fluid conduit, back pressure regulators, nozzles, orifice plates, venturi but is not limited to this list. Those skilled in the art will recognize that the preferred method of supplying back pressure is dependent upon the process operating conditions such as the following, but not limited to: fluid surface tension, flow rates, temperature, system downturn, and other factors.

Figure 2A:
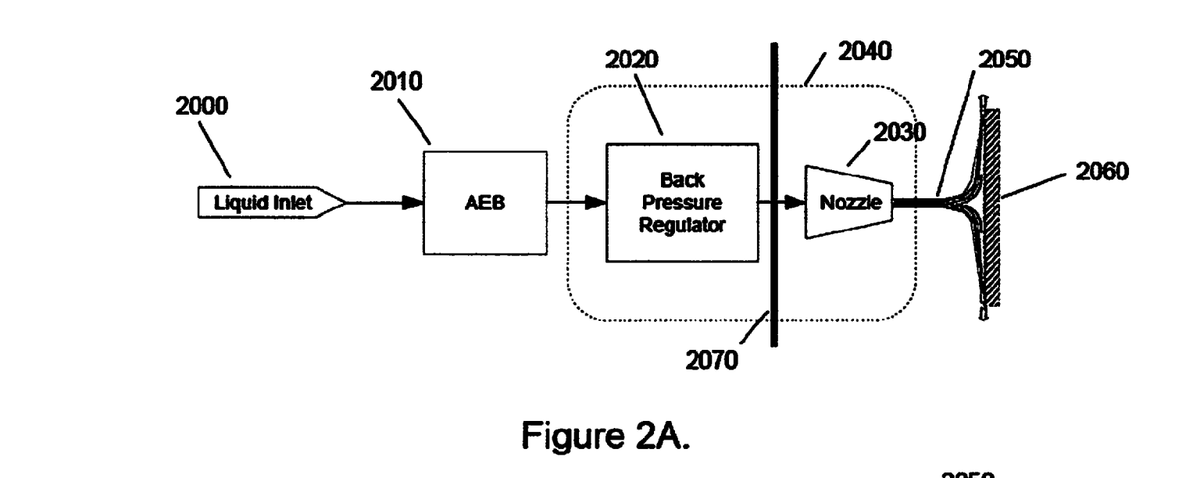
FIG. 2A is an illustration of the sequential process flow diagram of the preferred embodiment of the arrangement of the present invention.
Figure 2B:
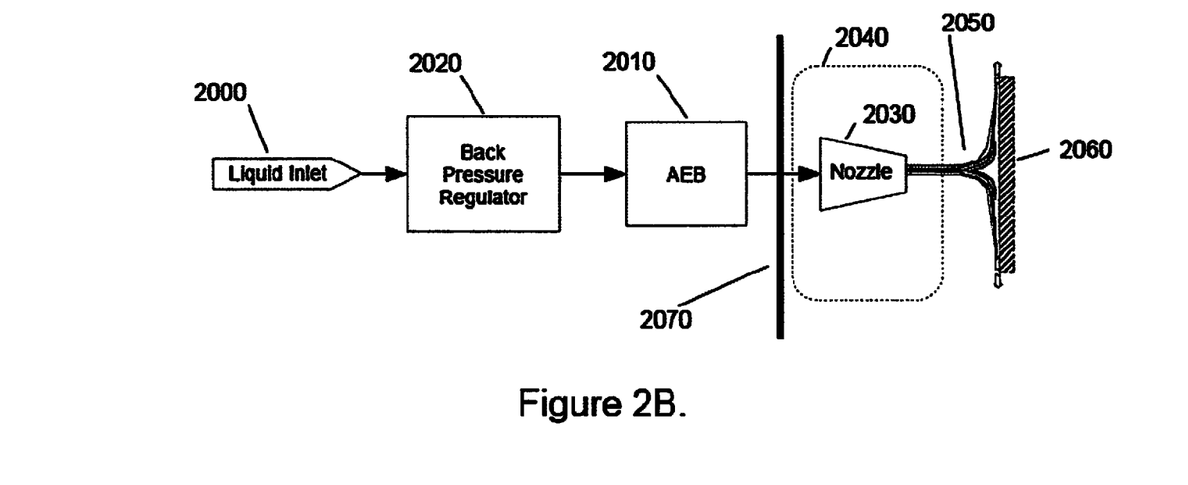
FIG. 2B is an illustration of an alternative sequential process flow diagram.

Alternatively, the sequential process steps of the present invention include the placement of a back pressure regulator [2020] upstream of the AEB [2010] (see FIG. 2B). This arrangement has utility in applications where pre-conditioning the liquid under process prior to acoustic stimulation by the AEB [2010] is desired.

Fluidly connected to the Back Pressure Device (2020) is a Shear Device (2030) that imparts shear forces within the Liquid (2000) under process that promotes the disengagement of the gas phase with the Liquid (2000). The shear device 2030 and the back pressure regulator 2020 are operably fluidly connected but separated by a pressure vessel wall 2070.

A Two (2) or Multi-Phase Separator (1030) is fluidly connected to the Shear Device (2030), wherein the Liquid (1000) under process proceeds to a second Multi-Phase Separator (1030) that is designed to retain the Liquid (1000)

for completing the disengagement process between the Gas (1050) and the Liquid (1000). The Multi-Phase Separator (1040) may include devices such as Shear Plate (2060)(see FIG. 2A, 2B) or 3060 (see FIG. 3) upon which the Liquid (1000) under process is projected with which, a jet of the Liquid (1000) of sufficient velocity and angle of impact impart desired levels of shear stress promoting the evolution of Gas (1050) from the Liquid (1000) stream. Those skilled in the art will recognize that there are a number of fluidic devices such as nozzles, high shear nozzles, wire mesh packs, divergent vanes, and other components that can be utilized to impart desired shear forces into the Liquid (1000). The proper selection will be based upon physical properties of the liquid under process, optimized to process flow rates and operating conditions of the system. Further, the means of gas evolution from the liquid is not limited to the above mentioned apparatus.

Figure 3:
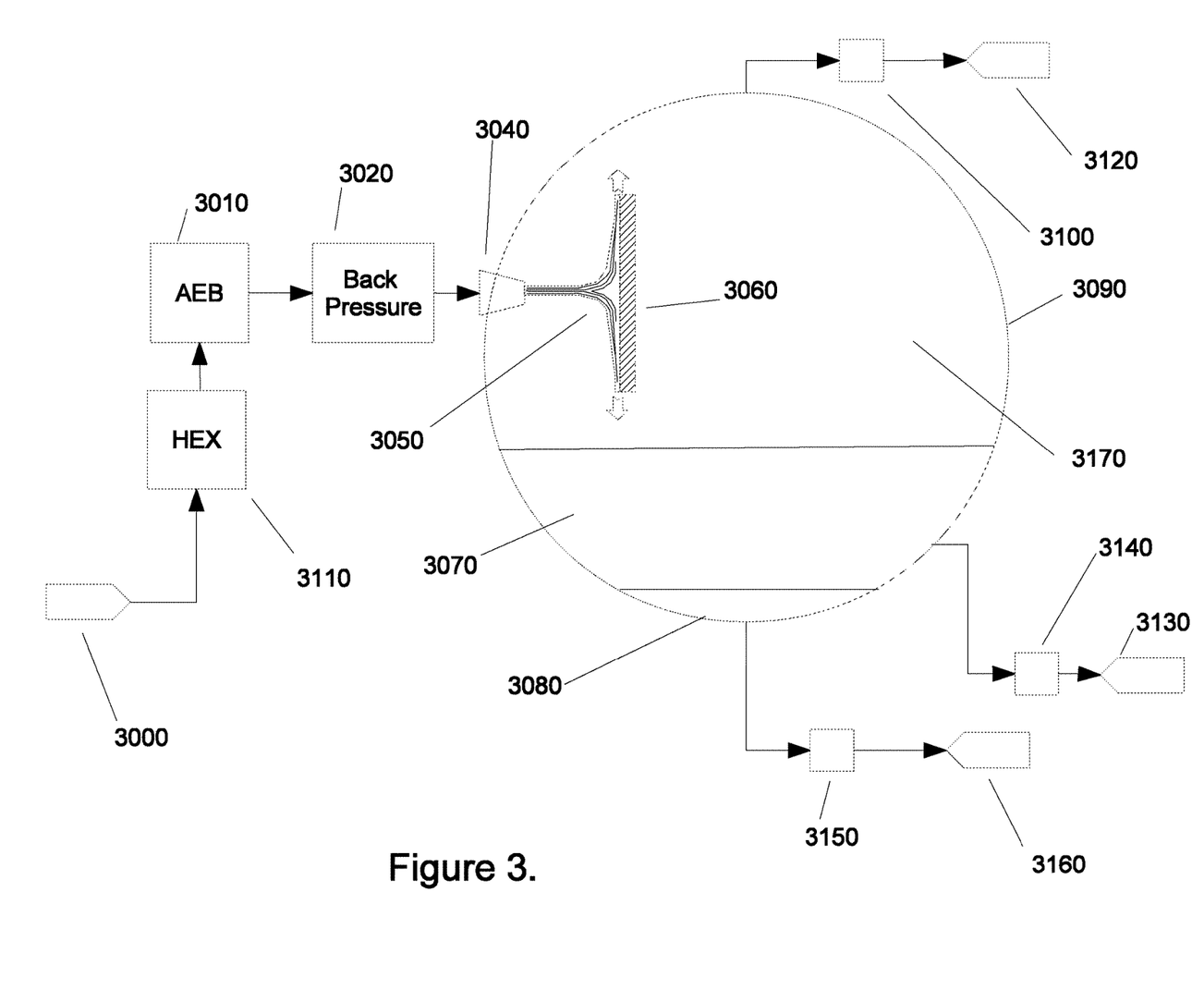
FIG. 3 is an illustration of the process with multi-phase separation vessel.

The secondary separation of the Liquid (3000) and Gas (3120) phases is conducted within a closed Vessel (3090), a Multi-Phase Separator (1030). The Multi-Phase Separator (1030) typically has orientation in the vertical or horizontal direction, but is not limited to such as depending upon the optimal system parameters and physical packaging. The Vessel (3090) will contain a Gas Space (3170) and a Liquid Space (3070 and 3080) in which secondary separation of Gas (3120) from the Liquid (3000) is achieved. A tertiary separation of the liquid emulsion of low density Hydrocarbon liquids (3070) and other higher density liquids such as Water (3080) are free to separate.

Gas (3120) evolved from the Liquid (3000) under process is fluidly conducted to downstream processes such as compression, flare or other gas control measures. Control of Gas (3120) within the Vessel (3090) requires pressure regulation by means of a pressure regulator (3100) such that the discharge pressure is suited for the downstream processes. For applications where the evolved gas does not require sequestration and control, the separation Vessel [3090] may be vented to the atmosphere.

The internal structure of the Vessel (3090) is not limited to any element or combination of elements including, but not limited to: baffles, surge suppressors, foam breakers, down comers, de-misting stages, trays, structured or random packing, etc.

Liquid Level (3070 and 3080) within the Vessel (3090) is not limited in any manner. Frequently, the Liquid (3000) under process is an emulsion of hydrocarbon, Brine, Solids and Water (BS&W). The AEB (3010) is known to promote the destabilization of these emulsions, leaving a Low Density Liquid (3070) of hydrocarbon product and High Density Liquid (3080) of BS&W. Total liquid levels of both the Low Density Liquid (3070) and High Density Liquid (3080) and their discharge is maintained by Flow Control Devices (3140 and 3150 respectively). Flow Control Devices (3140 and 3150) may be comprised of any mechanism and is not limited to the following list: gravity, mechanical and/or electrical sensors, electrical and/or mechanical controllers and electrical and/or mechanical valves are utilized in the preferred embodiment of the present invention. Those skilled in the art will recognize that liquid level control design will be dependent on a variety of factors that make selected solution appropriate for a realized application.

Effectiveness of gas 3120 evolution and final liquid composition (3070 and 3080) is based upon process parameters. Some process parameters that effect the final composition are the internal pressure of the Vessel (3090), temperature of the liquid under process, and acoustic power per unit volume of liquid processed. Increasing pressure within the Vessel (3090) tends to inhibit release of <$C_3$ hydrocarbon species from the liquid. Increasing temperature increases overall vapor pressure of the fluid that enhances removal of $C_3$-$C_5$ hydrocarbon species. Further increasing the acoustic power per unit volume of liquid processed increases the thermal content of the evolved gas, while increasing the overall density of the fluid.

Figure 4:
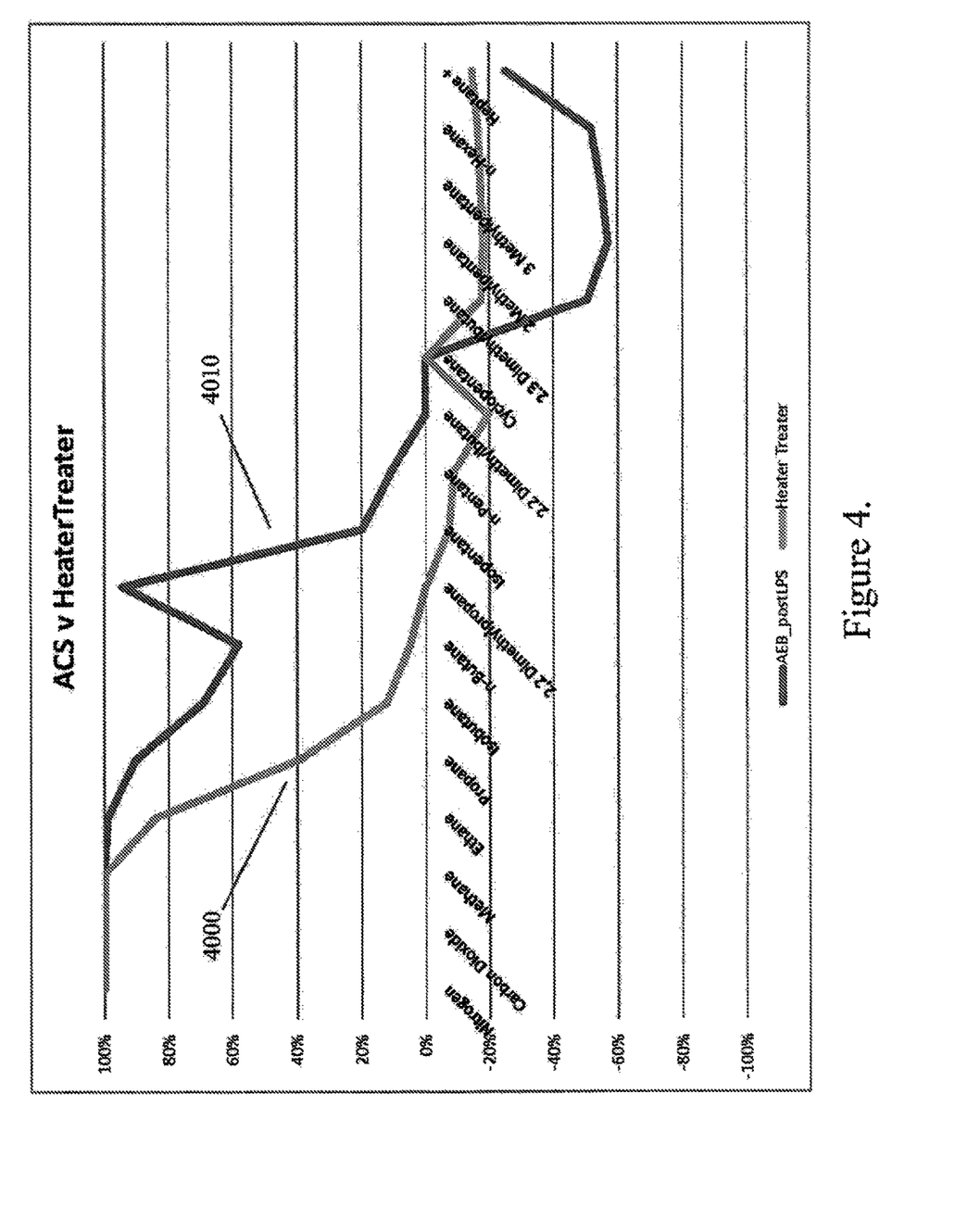
FIG. 4 is a graphic showing a comparison of a hydrocarbon composition post conventional heater treater stabilizer and the present invention of the preferred embodiment.

The effectiveness of the process is shown in FIG. 4, showing the molar percentage change in the hydrocarbon composition of a Condensate processed with conventional thermal stabilizer, a heater treater as is known in the art (4000) is compared to that processed via the ACS (4010) of the present invention. Both the Heater Treater (4000) and ACS (4010) effectively removed 100% of the Nitrogen, Carbon Dioxide and Methane from the Liquid (3000) under process. However, the ACS (4010) was able to remove significantly greater percentages of the Ethane, Propane, Isobutane, n-Butane, 2,2 Dimethylpropane, Isopentane, n-Pentane, 2,2 Dimethylbutane, Cyclopentane and 2,3, Dimethylbutane than the Heater Treater (4000). The apparent negative percentage removal of the 2 Methylpentane plus components in the ACS (4010) graph is an artifact of the final molar percentage not normalized to the final volume of processed Liquid (3070).

Having thus described the invention in connection with the preferred embodiment thereof, it will be evident to those skilled in the art the various revisions and modifications can be made to the invention described herein without departing from the spirit and scope of the invention. It is my intention, however, that all such revisions and modifications that are obvious to those skilled in the art will be included within the scope of the following.

The invention claimed is:

1. A method for degassing a fluid stream comprising:
providing an incoming multiphase fluid stream having a first component with a first vapor pressure and a second component having a second vapor pressure higher than the first vapor pressure;
generating bubbles in the multiphase fluid stream by applying acoustic energy to the multiphase fluid stream;
increasing sizes of the bubbles in the multiphase fluid stream by reducing pressure of the multiphase fluid stream;
directing the multiphase fluid stream having the bubbles of increased size onto a surface to burst the bubbles to separate gas in the bubbles from a liquid portion of the multiphase fluid stream, wherein the liquid portion has a low density liquid and a high density liquid; and
passing the low density liquid through a first flow control device;
passing the high density liquid through a second flow control device, wherein the surface is arranged in a substantially closed vessel.

2. The method of claim 1 further comprising:
accelerating the multiphase fluid stream having the bubbles of increased size to form a jet.

3. The method of claim 1, further comprising:
drawing the gas from the bubbles out of the substantially closed vessel.

4. The method of claim 1, further comprising:
collecting the liquid portion at a bottom of the substantially closed vessel.

5. The method of claim 1, further comprising:
heating the multiphase fluid stream.

6. The method of claim 1, wherein the acoustic energy applied to the multiphase fluid stream is applied by acoustic emulsion breaker.

7. The method of claim 1, wherein the surface causes a change in momentum of the multiphase fluid stream.

8. The method of claim 1, further comprising:
capturing the gas.

9. The method of claim 1, further comprising:
retaining liquid portion.

* * * * *